(12) United States Patent
Kii (10) Patent No.: US 7,499,108 B2
(45) Date of Patent: Mar. 3, 2009

(54) IMAGE SYNTHESIS APPARATUS, ELECTRICAL APPARATUS, IMAGE SYNTHESIS METHOD, CONTROL PROGRAM AND COMPUTER-READABLE RECORDING MEDIUM

(75) Inventor: Yasuyuki Kii, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 626 days.

(21) Appl. No.: 11/240,803

(22) Filed: Oct. 3, 2005

(65) Prior Publication Data

US 2006/0072041 A1 Apr. 6, 2006

(30) Foreign Application Priority Data

Oct. 1, 2004 (JP) ............................ 2004-290805

(51) Int. Cl.
*H04N 9/74* (2006.01)
*H04N 9/76* (2006.01)

(52) U.S. Cl. ..................... 348/586; 348/591; 348/599

(58) Field of Classification Search ............... 348/586, 348/590, 591, 593, 597–599; 345/611, 629, 345/634, 640; *H04N 9/74, 9/76*
See application file for complete search history.

(56) References Cited

U.S. PATENT DOCUMENTS 6,667,774 B2 * 12/2003 Berman et al. .............. 348/586
7,006,155 B1 * 2/2006 Agarwala et al. ........... 348/597
7,215,830 B2   5/2007 Knee et al.

FOREIGN PATENT DOCUMENTS

JP      4-340671      11/1992
JP      11-272846 A   10/1999

OTHER PUBLICATIONS

Japanese Office Action mailed Sep. 2, 2008 in corresponding JP application 2004-290805.

* cited by examiner

*Primary Examiner*—Sherrie Hsia
(74) *Attorney, Agent, or Firm*—Nixon & Vanderhey, P.C.

(57) ABSTRACT

The image synthesis apparatus 10 includes an anti-aliasing processing circuit 11 for generating a foreground image having a reduced aliasing by blending the color information and blending the alpha information for each dot of the input foreground image, and an image synthesizing circuit 15 for synthesizing the color information of the foreground image having the reduced aliasing and the color information of the background image, using the alpha information of the foreground image having the reduced aliasing.

19 Claims, 4 Drawing Sheets

IMAGE SYNTHESIS APPARATUS, ELECTRICAL APPARATUS, IMAGE SYNTHESIS METHOD, CONTROL PROGRAM AND COMPUTER-READABLE RECORDING MEDIUM

This Nonprovisional application claims priority under 35 U.S.C. §119(a) on Patent Application No. 2004-290805 filed in Japan on Oct. 1, 2004, the entire contents of which are hereby incorporated by reference.

BACKGROUND

1. Field of the Invention

The technology disclosed herein relates to an image synthesis apparatus for synthesizing a foreground image with a background image. The foreground image is, for example, a 3D object image for which an anti-aliasing process is performed. The background image is, for example, a 2D image such as a natural image. The technology disclosed herein further relates to an electrical apparatus including the image synthesis apparatus, such as a portable game device; an image synthesis method using the image synthesis apparatus; a control program for making a computer to execute each step of the image synthesis method; and a computer-readable recording medium recorded thereon the control program.

2. Description of the Related Art

Conventionally, an image synthesizing process for synthesizing a foreground image (e.g. a 3D object image) with a background image (e.g. a 2D image such as a natural image) is known in a digital image processing technique. For example, the image synthesizing process is performed as follows.

A background image such as a scenery and a foreground image such as an image of a car are prepared. Then, a mask process is performed to separate a predetermined area from the foreground image. For example, in this mask process, only an area corresponding the car is cut out of the foreground image.

Next, in order to overlap the cut out area of the foreground image over the background image, a location of the cut out area within the background image is determined, a scaling ratio for the cut out area is determined, and the color of the cut out area is adjusted. Then, the foreground image is synthesized with the background image.

In this image synthesizing process, an anti-aliasing process is performed to reduce aliasing which causes the display of the outline portion of the foreground image like the steps and the creation of flicker-line. In the anti-aliasing process, the color information is blended (averaged) for each pixel (or each dot) of the foreground image.

For example, in the anti-aliasing process using the M*N super-sampling method, a foreground image data having a size of X*M dots along the horizontal direction and Y*N dots along the vertical direction is input, while a foreground image having a size of X dots along the horizontal direction and Y dots along the vertical direction is output. For each dot of the output image data, the M*N number of color information of the input image data is averaged (blended) and then the averaged (blended) color information is output. According to the M*N super-sampling method, it is possible to display the outline portion of the foreground image more beautifully by using a broader range of data.

Further, an alpha synthesizing process is performed to improve artificial appearance and/or discontinuation of the borderline portion between the background image and the foreground image.

In the alpha synthesizing process, an alpha value representing the weighting of the foreground image and the background image is set, for example, under the assumption that. a value of "1" is assigned for a pixel which is located inside the mask and a value of "0" is assigned for a pixel which is located outside the mask. Then, the color information of the background image and the color information of the foreground image are blended (averaged with weight) by the use of the alpha value.

Conventionally, in synthesizing the foreground image (e.g. a 3D object image) with the background image (e.g. a 2D image such as a natural image), one problem to be solved is how to determine a synthesizing ratio between the foreground image and the background image.

As a method for solving the problem above, for example, a method disclosed in Japanese laid-open patent publication No. 4-340671 is known. In this method, the alpha value is calculated depending on a shape of the mask in the vicinity of the outline portion of the foreground image, and then the foreground image and the background image are synthesized using the alpha value.

However, according to the method disclosed in Japanese laid-open patent publication No. 4-340671, re-calculation of the alpha value for each dot of the foreground image is required prior to the image synthesizing process. This causes a problem that the time required for the image synthesis is increased.

Further, the dot information around the outline portion of the foreground image is required to calculate the alpha value. This causes a problem that it is necessary to store information for previous several lines even if a drawing system is used for performing the process line by line.

The technology disclosed herein is intended to solve the conventional problems described above. One purpose of the technology disclosed herein is to provide an image synthesis apparatus capable of performing an image synthesizing process at a higher speed without re-calculating the alpha value in synthesizing the foreground image with the background image and capable of performing the image synthesizing process without changing configuration even if a drawing system is used for performing the process line by line. Another purpose of the technology disclosed herein is to provide an electrical apparatus including the image synthesis apparatus; an image synthesis method using the image synthesis apparatus; a control program for making a computer to execute each step of the image synthesis method; and a computer-readable recording medium recorded thereon the control program.

SUMMARY

According to one aspect of the technology disclosed herein, an image synthesis apparatus is provided for synthesizing a foreground image with a background image. The image synthesis apparatus includes: an anti-aliasing processing section for performing an anti-aliasing process which generates a foreground image having a reduced aliasing, by blending color information of the foreground image for each pixel of the foreground image and by blending alpha information representing the weighting of the foreground image and the background image; and an image synthesizing section for performing an image synthesizing process which synthesizes the color information of the foreground image having the reduced aliasing with the color information of the background image, using the alpha information of the foreground image having the reduced aliasing.

Preferably, the image synthesis apparatus further includes: a foreground color information storing section for storing the color information of the foreground image having the reduced aliasing; a foreground alpha information storing section for storing the alpha information of the foreground image having the reduced aliasing; and a background color information storing section for storing the color information of the background image.

Preferably, foreground image data including color information and alpha information for each pixel of an input image is input to the anti-aliasing processing section as the foreground image, and background image data including color information for each pixel of the input image is input to the image synthesizing section as the background image.

Preferably, the anti-aliasing process is performed in accordance with an M*N super-sampling method, using the foreground image data having a size of X*M pixels along a horizontal direction and Y*N pixels along a vertical direction, as an input to the anti-aliasing process, where M is a positive integer, N is a positive integer, the foreground image data output from the anti-aliasing process has a size of X pixels along the horizontal direction and Y pixels along the vertical direction, X is a positive integer, and Y is a positive integer.

Preferably, the foreground image data includes color information $c(i, j)$ and alpha information $a(i, j)$ for each pixel $d(i, j)$, where $i=0$ to $X*M-1$, $j=0$ to $Y*N-1$; X, Y, M and N are positive integers.

Preferably, the alpha information represents opaque as a value of "100" and represents transparence as a value of "0".

Preferably, the alpha information is obtained using mask information by converting a masked dot into a value of "0" and converting an unmasked dot into a value of "100", when a portion of an image is extracted as the foreground image.

Preferably, the alpha information is obtained by initializing all of alpha values in a frame buffer into a value of "0", when a 3D object rendering is output from a 3D image processing circuit.

Preferably, the alpha information is obtained by setting a alpha value of the pixel to a value of "100" or a value of "1" through "99" representing a degree of opaqueness of a 3D object, when the 3D object is drawn in the frame buffer.

Preferably, in the anti-aliasing process, the blending of the color information and the blending of the alpha information are performed for a pixel of interest $D(p, q)$ ($p=0$ to $X-1$: $q=0$ to $Y-1$) within the output image data in accordance with the following (Expression 1) and (Expression 2), $$C(p, q)=\Sigma\ c'(i, j)/M*N \quad \text{(Expression 1)}$$

$$A(p, q)=\Sigma\ a(i, j)/M*N \quad \text{(Expression 2)}$$

where $C(p, q)$ denotes the color information for the pixel of interest, $A(p, q)$ denotes the alpha information for the pixel of interest, $i=p*M$ to $p*M+M-1$, $j=q*N$ to $q*N+N-1$, $c'(i, j)$ is equal to 0 when $a(i, j)$ is equal to 0, and $c'(i, j)$ is equal to $c(i, j)$ when $a(i, j)$ is not equal to 0.

Preferably, in the image synthesizing process, the color information $RC(r, s)$ for a pixel of interest $RD(r, s)$ ($r=0$ to $X-1$, $s=0$ to $Y-1$) within the output image data is calculated in accordance with the following (Expression 3), $$RC(r, s)=\{FC(r, s)*FA(r, s)+BC(r, s)*(100-FA(r, s))\}/100 \quad \text{(Expression 3)}$$

where $FC(r, s)$ denotes the color information of the foreground image, $FA(r, s)$ denotes the alpha information of the foreground image, and $BC(r, s)$ denotes the color information of the background image.

Preferably, each of the foreground color information storing section, the foreground alpha information storing section and the background color information storing section has a memory capacity capable of storing information for all of the pixels of the image having a predetermined size.

Preferably, the anti-aliasing process and the image synthesizing process are performed for each image having the predetermined size.

Preferably, each of the foreground color information storing section, the foreground alpha information storing section and the background color information storing section has a memory capacity capable of storing information for a single line of the image having a predetermined size.

Preferably, the anti-aliasing process and the image synthesizing process are performed for each single line of the image having the predetermined size.

Preferably, the predetermined size is a single frame.

According to another aspect of the technology disclosed herein, an electronic apparatus is provided. The electronic apparatus is capable of displaying a foreground image within a background image on a display screen, and includes the image synthesis apparatus described above.

According to another aspect of the technology disclosed herein, an image synthesis method is provided for synthesizing a foreground image with a background image. The image synthesis method includes the steps of: performing an anti-aliasing process which generates a foreground image having a reduced aliasing, by blending color information of the foreground image for each pixel of the foreground image and by blending alpha information representing the weighting of the foreground image and the background image; and performing an image synthesizing process which synthesizes the color information of the foreground image having the reduced aliasing with the color information of the background image, using the alpha information of the foreground image having the reduced aliasing.

According to another aspect of the technology disclosed herein, a control program is provided for making a computer to execute each step of the image synthesis method described above.

According to another aspect of the technology disclosed herein, a computer-readable recording medium is provided. The control program described above is recorded on the computer-readable recording medium.

The function of the technology disclosed herein is described below.

According to the technology disclosed herein, the color information of the background image and the color information of the foreground image and the alpha information of the foreground image are input. Then, during the anti-aliasing process for the foreground image, the blending of the color information of the foreground image and the blending of the alpha information are performed simultaneously, and the resultant color information and the resultant alpha information are stored. Then, during the image synthesizing process, the color information of the foreground image for which the anti-aliasing process is performed is synthesized with the color information of the background image, using the alpha information of the foreground image calculated in the anti-aliasing process.

Thus, the alpha value is calculated during the anti-aliasing process. Accordingly, extra time for calculating the alpha value is not required and re-calculation of the alpha value during the image synthesizing process is not required, unlike the conventional method disclosed in Japanese laid-open patent publication No. 4-340671. As a result, it is possible to perform the image synthesizing process at a higher speed.

Further, it is possible to configure each of the foreground color buffer, the foreground alpha buffer and the background color buffer to store information for a single line of the image having a predetermined size (e.g. one frame). In this case, by performing the process line by line using the anti-aliasing processing circuit and the image synthesizing circuit, it is possible to reduce the required circuits, processes and/or memory capacities, thereby reducing the size of the image synthesis apparatus. As a result, it is possible to realize the image synthesis apparatus suitable for a portable electrical apparatus such as a portable game device. The electrical apparatus including the image synthesis apparatus is capable of displaying the foreground image within the background image on a display screen.

As described above, according to the technology disclosed herein, during the anti-aliasing process for the foreground image, the blending of the color information of the foreground image and the blending of the alpha information are performed simultaneously. Then, during the image synthesizing process, the color information of the foreground image for which the anti-aliasing process is performed is synthesized with the color information of the background image, using the alpha information of the foreground image for which the anti-aliasing process is performed. Accordingly, extra time for calculating the alpha value is not required and re-calculation of the alpha value during the image synthesizing process is not required, unlike the conventional method. As a result, it is possible to perform the image synthesizing process at a higher speed.

Further, it is possible to provide a storage section such as a buffer for storing information for a single line. In this case, by performing the process line by line, it is possible to reduce the required circuits, processes and/or memory capacities, thereby reducing the size of the image synthesis apparatus. As a result, it is possible to realize the image synthesis apparatus suitable for a portable electrical apparatus such as a portable game device.

These and other advantages of the technology disclosed herein will become apparent to those skilled in the art upon reading and understanding the following detailed description with reference to the accompanying figures.

10, 20 Image synthesis apparatus
11 Anti-aliasing processing circuit
12 Foreground color buffer (foreground color information storing section)
13 Foreground alpha buffer (foreground alpha information storing section)
14 Background color buffer (background color information storing section)
15 Image synthesizing circuit
21 Control section (CPU)
21A Anti-aliasing processing section
21B Image synthesizing processing section
22 ROM (storing section)
23 RAM (storing section)

DESCRIPTION OF THE PREFERRED EMBODIMENTS

Hereinafter, the image synthesis apparatus according to embodiments 1 and 2 of the technology disclosed herein is described below with references to the drawings.

Embodiment 1

In embodiment 1, a case where the image synthesis apparatus of the present invention is implemented by a hardware is described.

Figure 1:
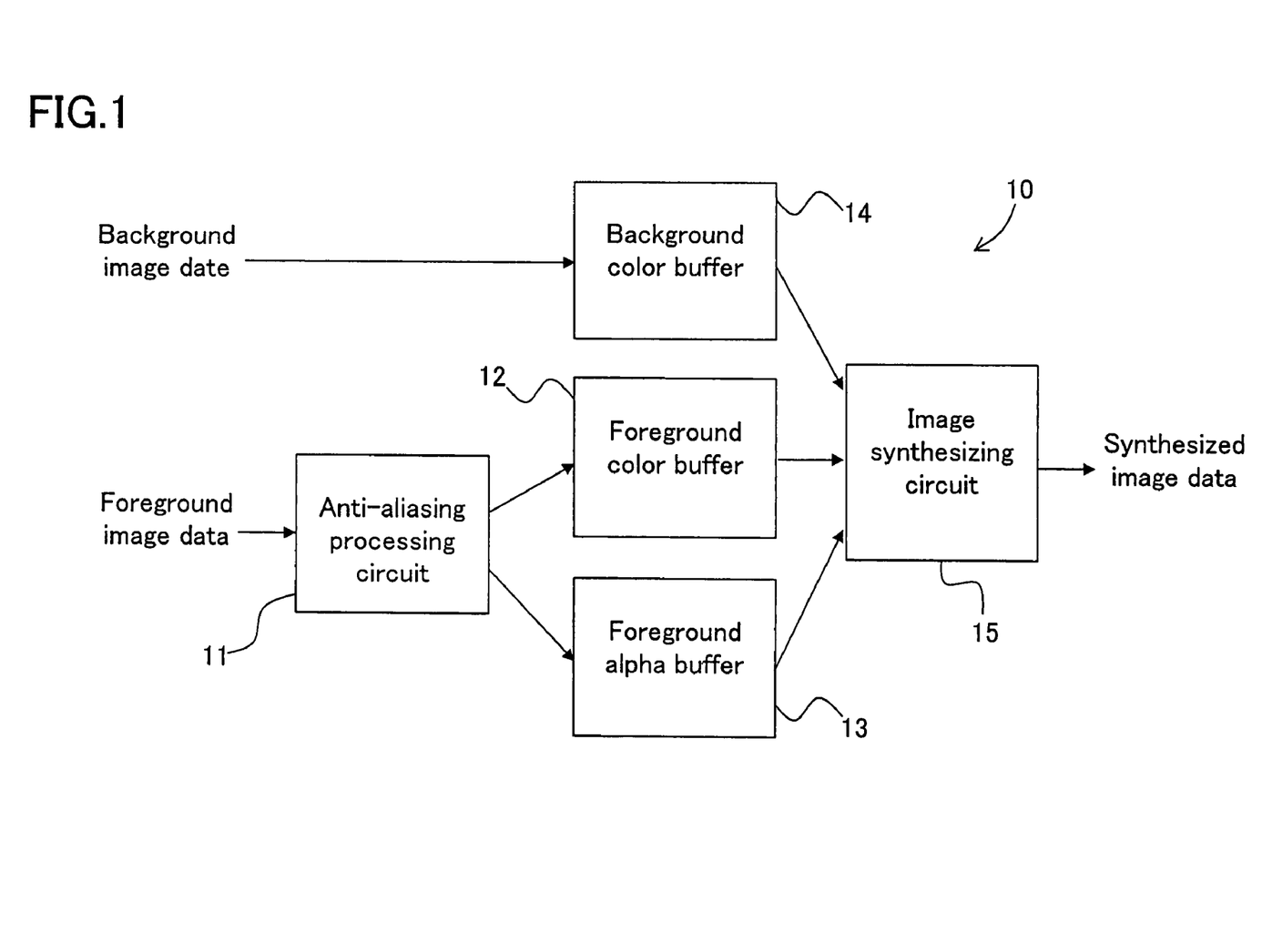
FIG. 1 is a block diagram showing an exemplary structure of an image synthesis apparatus according to embodiment 1 of the technology disclosed herein.

FIG. 1 is a block diagram showing an exemplary structure of an image synthesis apparatus according to example embodiment 1 of the technology disclosed herein.

As shown in FIG. 1, the image synthesis apparatus 10 according to embodiment 1 includes a anti-aliasing processing circuit 11 which receives foreground image data, a foreground color buffer 12 which functions as a foreground color information storing section for storing color information from the anti-aliasing processing circuit 11, a foreground alpha buffer 13 which functions as a foreground alpha information storing section for storing alpha information from the anti-aliasing processing circuit 11, a background color buffer 14 which receives background image data and functions as a background color information storing section, and an image synthesizing circuit 15 which receives the respective stored information from the foreground color buffer 12, the foreground alpha buffer 13 and the background color buffer 14 and outputs a synthesized image data.

Foreground image data including color information and alpha information for each pixel (or each dot) is input to the anti-aliasing processing circuit 11 as digital data. The alpha information represents the weighting of the foreground image and the background image. The anti-aliasing processing circuit 11 performs an anti-aliasing process in which the blending of the color information and the blending of the alpha information are performed for each dot of the input foreground image data.

The circuit for performing the blending of the color information and the blending of the alpha information implements a high-speed processing using various logical circuits such as an adder and a divider in terms of hardware. A computing circuit for performing the blending of the color information and a computing circuit for performing the blending of the alpha information can be implemented by a similar circuit. Therefore, there is a benefit that a circuit can be commonly used for these computing circuits. However, herein, these computing circuits are provided in parallel, so that the blending of the color information and the blending of the alpha information can be performed simultaneously in order to increase the processing speed. Thus, the blending of the alpha information is performed during the blending of the color information. Therefore, extra time is not required for the blending of the alpha information, and re-calculation of the alpha value is not required when the foreground image and the background image are synthesized, unlike the conventional method. As a result, the processing speed can be increased.

The foreground color buffer 12 stores the color information whose aliasing is reduced by the anti-aliasing processing circuit 11, as a result of the anti-aliasing process.

The foreground alpha buffer 13 stores the alpha information whose aliasing is reduced by the anti-aliasing processing circuit 11, as a result of the anti-aliasing process.

Background image data including color information is input to the background color buffer 14 as digital data. The background color buffer 14 stores the color information of the background image data.

The image synthesizing circuit 15 synthesizes the color information of the foreground image data stored in the foreground color buffer 12 with the color information of the background image data stored in the background color buffer 14, using the alpha information of the foreground image data stored in the foreground alpha buffer 13, and outputs the synthesized image data as a result of the synthesizing process.

Hereinafter, an image synthesis method using the image synthesis apparatus 10 according to the present embodiment is described below.

The operation of the anti-aliasing processing circuit 11 is described.

Figure 2:
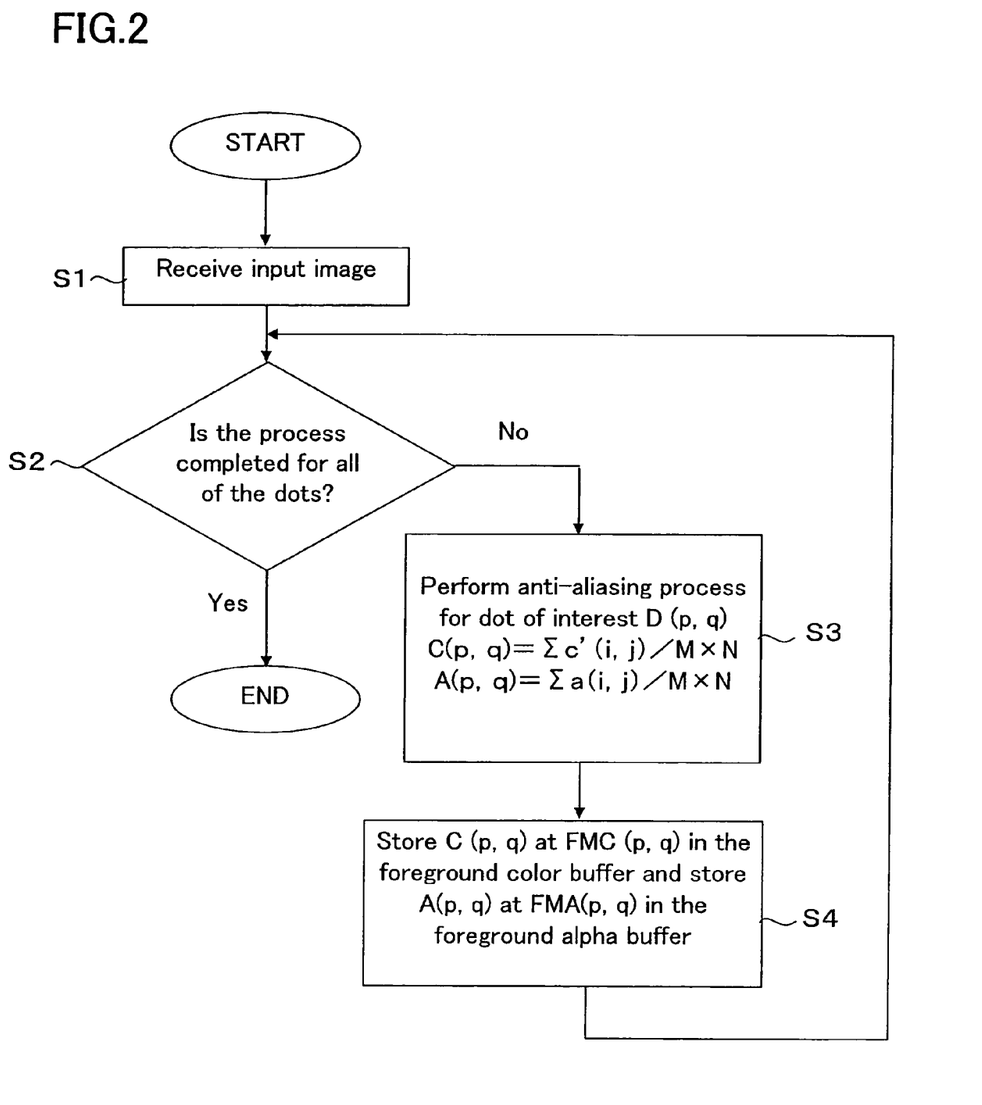
FIG. 2 is a flowchart showing an exemplary procedure of the anti-aliasing process performed by the anti-aliasing processing circuit shown in FIG. 1.

FIG. 2 is a flowchart showing an exemplary anti-aliasing process which is performed by the anti-aliasing processing circuit 11 shown in FIG. 1. The steps shown in FIG. 2 are described below step by step.

As shown in FIG. 2, in step S1, the foreground image data is input to the anti-aliasing processing circuit 11.

In embodiment 1, an M*N super-sampling method is described as one example of a method for performing the anti-aliasing process. In the M*N super-sampling method, when the image data to be output from the anti-aliasing processing circuit 11 has a size of X dots in the horizontal direction and Y dots along the vertical direction, the image data having a size of X*M dots along the horizontal direction and Y*N dots along the vertical direction is input to the anti-aliasing processing circuit 11. Herein, X, Y, M and N are positive integers.

Further, in embodiment 1, it is assumed that the foreground image data including the alpha information is input to the anti-aliasing processing circuit 11. In this alpha information, for example, opaque is set as a value of "100" and transparence is set as a value of "0". When a portion of an image is cut out as the foreground image, the alpha information is obtained by converting a masked dot into a value of "0" and converting an unmasked dot into a value of "100", using information for cutting out a portion of the image which is generally called mask information. When a 3D object rendering is output from a 3D image processing circuit, all of the alpha values within the frame buffer are initialized into a value of "0" in advance. This is because, if there is the remaining data within the frame buffer, the remaining data may cause adverse effect. When the 3D object is drawn in the frame buffer, the alpha information is updated such that the alpha value of the drawn dot is set to a value of "100" or a value of "1" to "99" representing a degree of opaqueness of the 3D object. Thus, the alpha information of the foreground image is obtained.

In step S1, foreground image data is input to the anti-aliasing processing circuit 11. The foreground image data includes at least color information $c(i, j)$ and alpha information $a(i, j)$ for each dot $d(i, j)$ within the input image, where $i=0$ to $X*M-1$ and $j=0$ to $Y*N-1$.

Next, in step S2, it is determined whether or not the computation is completed for all of the dots. When the computation is completed for all of the dots, the anti-aliasing process is completed. When there is a pixel (or dot) for which the computation is not completed, the process proceeds to step S3.

In step S3, the anti-aliasing process is performed for the dot for which the computation is not completed.

In the anti-aliasing process, the blending of the color information and the blending of the alpha information are performed for a dot of interest $D(p, q)$ ($p=0$ to $X-1$; $q=0$ to $Y-1$) within the output image data in accordance with the following (Expression 1) and (Expression 2).

$$C(p, q)=\Sigma c'(i, j)/M*N \quad \text{(Expression 1)}$$

$$A(p, q)=\Sigma a(i, j)/M*N \quad \text{(Expression 2)}$$

where $C(p, q)$ denotes the color information for the dot of interest, $A(p, q)$ denotes the alpha information for the dot of interest, $i=p*M$ to $p*M+M-1$, $j=q*N$ to $q*N+N-1$, $c'(i, j)$ is equal to 0 when $a(i, j)$ is equal to 0, and $c'(i, j)$ is equal to $c(i, j)$ when $a(i, j)$ is not equal to 0.

In step S4, the color information $C(p, q)$ is stored at a corresponding memory area $FMC(p, q)$ within the foreground color buffer 12, and the alpha information $A(p, q)$ is stored at a corresponding memory area $FMA(p, q)$ within the foreground alpha buffer 13. Then, the process returns back to step S2, where it is determined whether or not the computation is completed for all of the dots.

As apparent from (Expression 2) above, in embodiment 1, the anti-aliasing process is performed such that the alpha information is calculated in the anti-aliasing process. Then, the calculated alpha information is stored in the foreground alpha buffer 13. As a result, re-calculation of the alpha information is not required during the image synthesizing process.

Figure 3:
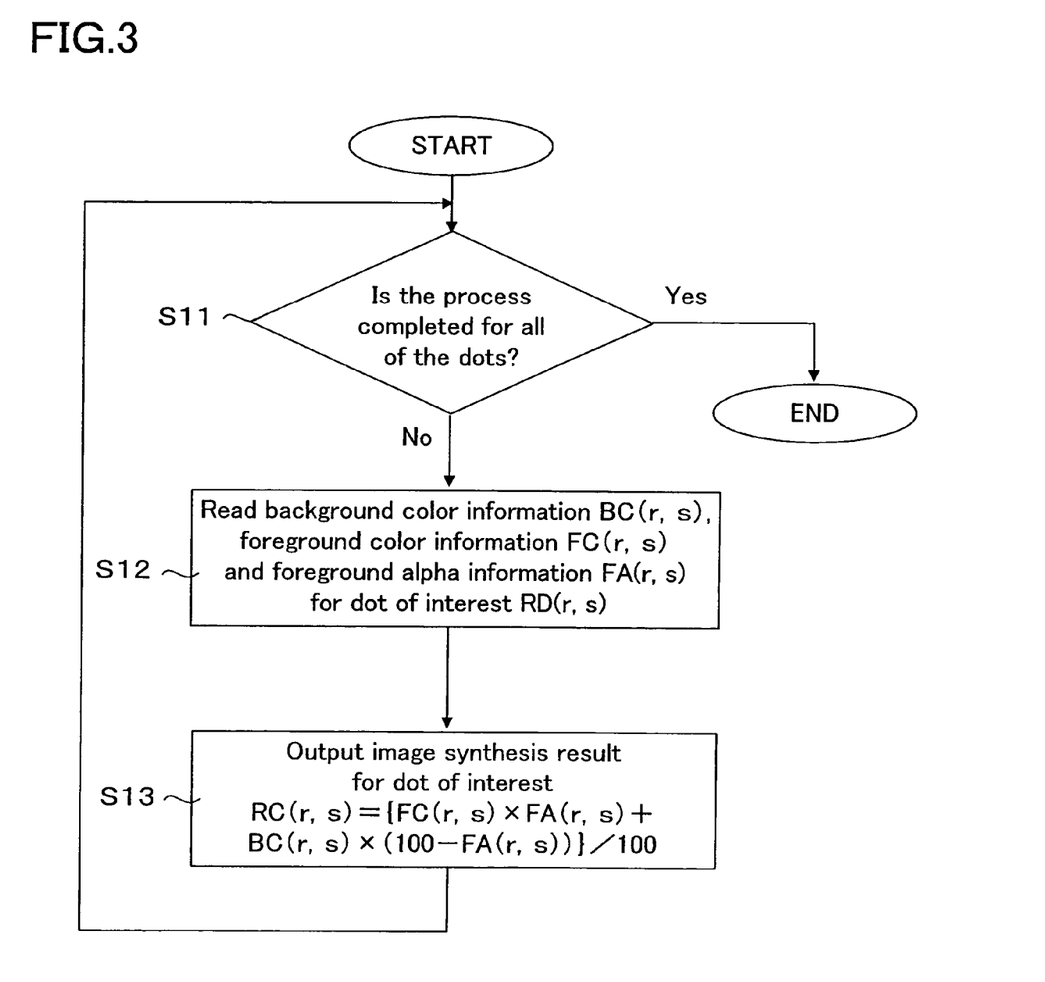
FIG. 3 is a flowchart showing an exemplary procedure of the image synthesizing process performed by the image synthesizing circuit shown in FIG. 1.

Next, the operation of the image synthesizing circuit 15 is described.

FIG. 3 is a flowchart showing an exemplary image synthesizing process which is performed by the image synthesizing circuit 15 shown in FIG. 1. The steps shown in FIG. 3 are described below step by step.

As shown in FIG. 3, in step S11, it is determined whether or not the processing is completed for all of the pixels (or dots). When the processing is completed for all of the dots, the image synthesizing process is completed. When there is a dot for which the processing is not completed, the process proceeds to step S12.

In step S12, the dot for which the processing is not completed is set as a dot of interest $RD(r, s)$ ($r=0$ to $X-1$; $s=0$ to $Y-1$). The color information $RC(r, s)$ of the dot of interest $RD(r, s)$ is calculated in accordance with the following (Expression 3).

$$RC(r, s)=\{FC(r, s)*FA(r, s)+BC(r, s)*(100-FA(r, s))\}/100 \quad \text{(Expression 3)}$$

where, $FC(r, s)$ denotes the color information of the foreground image stored in the foreground color buffer 12, $FA(r, s)$ denotes the alpha information of the foreground image stored in the foreground alpha buffer 13, and $BC(r, s)$ denotes the color information of the background image stored in the background color buffer 14.

As apparent from (Expression 3) above, in the present embodiment, the color information of the foreground image and the color information of the background image are blended according to values of the alpha information of the foreground image. As a result, the foreground image and the background image can be synthesized well without making the color of the outline portion of the foreground image unnatural.

In the present embodiment, it is assumed that each of the foreground color buffer 12, the foreground alpha buffer 13 and the background color buffer 14 has a memory capacity capable of storing information for all of the dots of the image to be synthesized. In this case, the anti-aliasing process by the anti-aliasing processing circuit 11 and the image synthesizing process by the image synthesizing circuit 15 are performed for each image. However, it is possible to configure each of the foreground color buffer 12, the foreground alpha buffer 13 and the background color buffer 14 to have a memory capacity capable of storing information for a single line of the image. In this case, it is possible to perform the anti-aliasing process by the anti-aliasing processing circuit 11 and the image synthesizing process by the image synthesizing circuit 15 for each single line of the image.

In the latter case, the anti-aliasing process is performed for a single line of the image by the anti-aliasing processing circuit 11. Then, the data on which the anti-aliasing process is performed is stored in the foreground color buffer 12 and the foreground alpha buffer 13. At the same time, a single line of the background image data corresponding to the single line of the foreground image is stored into the background color buffer 14. Then, the image synthesizing process is performed for each single line of the image by the image synthesizing circuit 15.

In this manner, by sequentially performing the anti-aliasing process and the image synthesizing process according to the number of lines of the image, it is possible to provide the image synthesis apparatus 10 according to the technology disclosed herein for use in a portable electrical apparatus in which the circuit size and the memory capacity are greatly restricted.

Embodiment 2

In embodiment 1, a case where the image synthesis apparatus of the present invention is implemented by a hardware is described. In embodiment 2, a case where the image synthesis apparatus of the technology disclosed herein is implemented by a software is described.

Figure 4:
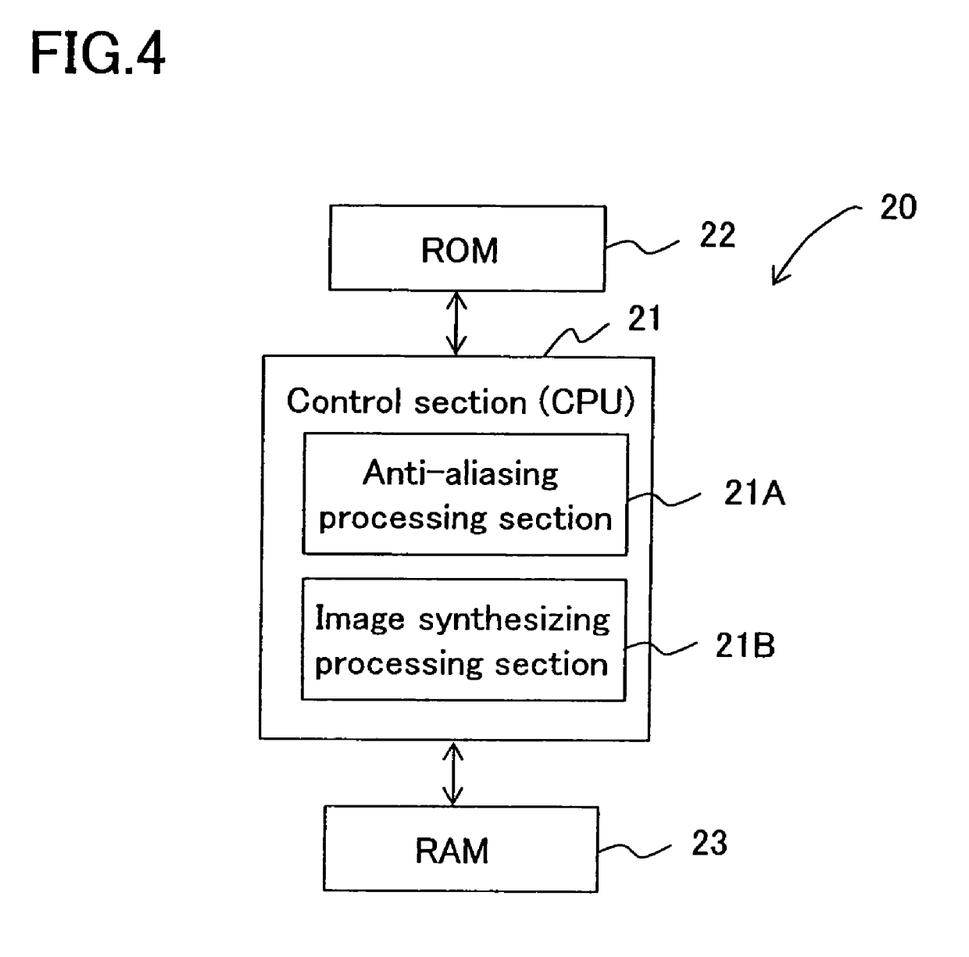
FIG. 4 is a block diagram showing an exemplary structure of an image synthesis apparatus (e.g. a computer) according to embodiment 2 of the technology disclosed herein.

FIG. 4 is a block diagram showing an exemplary structure of an image synthesis apparatus according to embodiment 2 of the technology disclosed herein. In this case, the image synthesis apparatus is implemented by a computer.

As shown in FIG. 4, the image synthesis apparatus 20 according to embodiment 2 includes a control section 21 consisting of CPU (Central Processing Unit), a ROM 22 as a computer-readable recording medium in which a control program describing a procedure (the steps shown in FIGS. 2 and 3) of the image synthesis method according to embodiment 2 which is to be executed by the computer and data used in the control program are stored, and a RAM 23 as a work memory used by the control section 21.

The control section 21 includes an anti-aliasing processing section 21A for performing the anti-aliasing process (see FIG. 2) in which the blending of the color information of the foreground image and the blending the alpha information of the foreground image are performed for each pixel (or dot) of the foreground image, based on the control program and the data according to the technology disclosed herein, and an image synthesizing processing section 21B for performing the image synthesizing process (see FIG. 3) in which the background image and the foreground image are synthesized using the alpha information after blending As a computer-readable recording medium, various recording medium can be used. For example, a small-sized portable storage device such as various IC memory, an optical disc (e.g. CD) and a magnetic recording medium (e.g. FD) can be used. The control program and the data according to the technology disclosed herein are stored in the ROM 22 as the computer-readable recording medium. The control program and the data are read from the ROM 22 and then they are stored in the RAM 23. The control program stored in the RAM 23 are executed by the control section 21.

The anti-aliasing process is performed using an M*N super-sampling method. In the M*N super-sampling method, when the foreground image data to be output from the anti-aliasing process has a size of X pixels along the horizontal direction and Y pixels along the vertical direction, the foreground imaged data having a size of X*M pixels along the horizontal direction and Y*N pixels along the vertical direction is input to the anti-aliasing process. Herein, X, Y, M and N are positive integers.

The foreground image data includes at least color information $c(i, j)$ and alpha information $a(i, j)$ for each pixel $d(i, j)$, where $i=0$ to $X*M-1$, $j=0$ to $Y*N-1$.

In the anti-aliasing process, the blending of the color information and the blending of the alpha information are performed for a pixel of interest $D(p, q)$ ($p=0$ to $X-1$; $q=0$ to $Y-1$) within the output image data in accordance with the following (Expression 1) and (Expression 2).

$$C(p, q) = \Sigma\, c'(i, j)/M*N \quad \text{(Expression 1)}$$

$$A(p, q) = \Sigma\, a(i, j)/M*N \quad \text{(Expression 2)}$$

where $C(p, q)$ denotes the color information for the pixel of interest, $A(p, q)$ denotes the alpha information for the pixel of interest, $i=p*M$ to $p*M+M-1$, $j=q*N$ to $q*N+N-1$, $c'(i, j)$ is equal to 0 when $a(i, j)$ is equal to 0, and $c'(i, j)$ is equal to $c(i, j)$ when $a(i, j)$ is not equal to 0.

The blending of the color information and the blending of the alpha information are performed by the control section 21, based on the control program (i.e. software). Further, the blending of the color information and the blending of the alpha information are performed in parallel and simultaneously. Thus, the blending of the alpha information is performed during the blending of the color information. Therefore, extra time is not required for the blending of the alpha information, and re-calculation of the alpha value is not required when the foreground image and the background image are synthesized, unlike the conventional method. As a result, the processing speed can be increased.

In the image synthesizing process, a dot of interest within the output image data is denoted by $RD(r, s)$, where $r=0$ to $X-1$ and $s=0$ to $Y-1$. The color information $RC(r, s)$ of the dot of interest $RD(r, s)$ is calculated in accordance with the following (Expression 3).

$$RC(r, s) = \{FC(r, s)*FA(r, s) + BC(r, s)*(100 - FA(r, s))\}/100 \quad \text{(Expression 3)}$$

where, $FC(r, s)$ denotes the color information of the foreground image, $FA(r, s)$ denotes the alpha information of the foreground image, and $BC(r, s)$ denotes the color information of the background image.

According to embodiments 1 and 2 described above, the image synthesis apparatuses 10 and 20 perform an anti-aliasing process which generates a foreground image having a reduced aliasing by blending the color information and blending the alpha information for each dot of the input foreground image, and also perform an image synthesizing process which synthesizes the color information of the foreground image having the reduced aliasing with the color information of the background image, using the alpha information of the foreground image having the reduced aliasing. As a result, it is possible to realize a high-speed processing without re-calculating the alpha value during the synthesizing process of the foreground image and the background image.

In the flowcharts shown in FIGS. 2 and 3, the process is performed for all of the dots of the foreground image. However, it is possible to perform the blending of the color information, the blending of the alpha information and/or the image synthesizing process for the detected dots of the outline portion of the foreground image.

In embodiment 1, the M*N super-sampling method is described as an example of a method for performing the anti-aliasing process. However, it is needless to say that any other method for performing the anti-aliasing process can be used.

As described above, the technology disclosed herein is exemplified by the use of its preferred embodiments 1 and 2. However, the technology disclosed herein should not be interpreted solely based on the embodiments 1 and 2 described above. It is understood that the scope of the technology disclosed herein should be interpreted solely based on the claims. It is also understood that those skilled in the art can implement equivalent scope of technology, based on the description of the technology disclosed herein and common knowledge from the description of the detailed preferred embodiments 1 and 2 of the technology disclosed herein. Furthermore, it is understood that any patent, any patent application and any references cited in the present specification should be incorporated by reference in the present specification in the same manner as the contents are specifically described therein.

The technology disclosed herein is applied to an image synthesis apparatus for synthesizing a foreground image with a background image. The foreground image is, for example, a 3D object image for which the anti-aliasing process is performed. The background image is, for example, a 2D image such as a natural image.

The technology disclosed herein is applied to an image synthesis apparatus for synthesizing a foreground image with a background image. The foreground image is, for example, a 3D object image for which the anti-aliasing process is performed. The background image is, for example, a 2D image such as a natural image. The technology disclosed herein is further applied to an electrical apparatus including the image synthesis apparatus, such as a portable game device; an image synthesis method using the image synthesis apparatus; a control program for making a computer to execute each step of the image synthesis method; and a computer-readable recording medium recorded thereon the control program.

According to the technology disclosed herein, when the foreground image for which the anti-aliasing process is performed is synthesized with the background image, the blending of the color information of the foreground image and the blending of the alpha information are performed during the anti-aliasing process of the foreground image, and then the color information of the foreground image for which the anti-aliasing process is performed is synthesized with the color information of the background image using the alpha information during the image synthesizing process.

Therefore, it is possible to perform the image synthesizing process at a higher speed without re-calculation of the alpha value during the image synthesizing process, unlike the conventional method. As a result, it is possible to obtain a synthesized image with good quality without making the color of the border portion of the foreground image unnatural.

Further, it is possible to provide a storage section such as a buffer for storing information for a single line. In this case, by performing the process line by line, it is possible to reduce the required circuits, processes and/or memory capacities, thereby reducing the size of the image synthesis apparatus. As a result, it is possible to realize the image synthesis apparatus suitable for a portable electrical apparatus such as a portable game device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image synthesis apparatus for synthesizing a foreground image with a background image, comprising:
    an anti-aliasing processing section for performing an anti-aliasing process which generates a foreground image having a reduced aliasing, by blending color information of the foreground image for each pixel of the foreground image and by blending alpha information representing the weighting of the foreground image and the background image; and
    an image synthesizing section for performing an image synthesizing process which synthesizes the color information of the foreground image having the reduced aliasing with the color information of the background image, using the alpha information of the foreground image having the reduced aliasing.

2. An image synthesis apparatus according to claim 1, further comprising:
    a foreground color information storing section for storing the color information of the foreground image having the reduced aliasing;
    a foreground alpha information storing section for storing the alpha information of the foreground image having the reduced aliasing; and
    a background color information storing section for storing the color information of the background image.

3. An image synthesis apparatus according to claim 2, wherein each of the foreground color information storing section, the foreground alpha information storing section and the background color information storing section has a memory capacity capable of storing information for all of the pixels of the image having a predetermined size.

4. An image synthesis apparatus according to claim 3, wherein the anti-aliasing process and the image synthesizing process are performed for each image having the predetermined size.

5. An image synthesis apparatus according to claim 3, wherein the predetermined size is a single frame.

6. An image synthesis apparatus according to claim 2, wherein each of the foreground color information storing section, the foreground alpha information storing section and the background color information storing section has a memory capacity capable of storing information for a single line of the image having a predetermined size.

7. An image synthesis apparatus according to claim 6, wherein the anti-aliasing process and the image synthesizing process are performed for each single line of the image having the predetermined size.

8. An image synthesis apparatus according to claim 1, wherein foreground image data including color information and alpha information for each pixel of an input image is input to the anti-aliasing processing section as the foreground image, and background image data including color information for each pixel of the input image is input to the image synthesizing section as the background image.

9. An image synthesis apparatus according to claim 8, wherein the anti-aliasing process is performed in accordance with an M*N super-sampling method, using the foreground image data having a size of X*M pixels along a horizontal direction and Y*N pixels along a vertical direction, as an input to the anti-aliasing process, where M is a positive integer, N is a positive integer, the foreground image data output from the anti-aliasing process has a size of X pixels along the horizontal direction and Y pixels along the vertical direction, X is a positive integer, and Y is a positive integer.

10. An image synthesis apparatus according to claim 8, wherein the foreground image data includes color information c(i, j) and alpha information a(i, j) for each pixel d(i, j), where i=0 to X*M−1, j=0 to Y*N−1; X, Y, M and N are positive integers.

11. An image synthesis apparatus according to claim 10, wherein, in the anti-aliasing process, the blending of the color information and the blending of the alpha information are performed for a pixel of interest D(p, q)(p=0 to X−1; q=0 to Y−1) within the output image data in accordance with the following (Expression 1) and (Expression 2), $$C(p, q) = \Sigma c'(i, j)/M*N \quad \text{(Expression 1)}$$

$$A(p, q) = \Sigma a(i, j)/M*N \quad \text{(Expression 2)}$$

where C(p, q) denotes the color information for the pixel of interest, A(p, q) denotes the alpha information for the pixel of interest,
i=p*M to p*M +M−1, j=q*N to q*N+N−1,
c'(i, j) is equal to 0 when a(i, j) is equal to 0, and c'(i, j) is equal to c(i, j) when a(i, j) is not equal to 0.

12. An image synthesis apparatus according to claim 1, wherein the alpha information represents opaque as a value of "100" and represents transparence as a value of "0".

13. An image synthesis apparatus according to claim 1, wherein the alpha information is obtained using mask information by converting a masked dot into a value of "0" and converting an unmasked dot into a value of "100", when a portion of an image is extracted as the foreground image.

14. An image synthesis apparatus according to claim 1, wherein the alpha information is obtained by initializing all of alpha values in a frame buffer into a value of "0", when a 3D object rendering is output from a 3D image processing circuit.

15. An image synthesis apparatus according to claim 14, wherein the alpha information is obtained by setting a alpha value of the pixel to a value of "100" or a value of "1" through "99" representing a degree of opaqueness of a 3D object, when the 3D object is drawn in the frame buffer.

16. An image synthesis apparatus according to claim 1, wherein, in the image synthesizing process, the color information RC(r, s) for a pixel of interest RD(r, s) (r=0 to X−1, s=0 to Y−1) within the output image data is calculated in accordance with the following (Expression 3), $$RC(r, s) = \{FC(r, s)*FA(r, s) + BC(r, s)*(100 - FA(r, s))\}/100 \quad \text{(Expression 3)}$$

where FC(r, s) denotes the color information of the foreground image, FA(r, s) denotes the alpha information of the foreground image, and BC(r, s) denotes the color information of the background image.

17. An electronic apparatus capable of displaying a foreground image within a background image on a display screen, comprising the image synthesis apparatus according to claim 1.

18. An image synthesis method for synthesizing a foreground image with a background image, comprising the steps of:
performing an anti-aliasing process which generates a foreground image having a reduced aliasing, by blending color information of the foreground image for each pixel of the foreground image and by blending alpha information representing the weighting of the foreground image and the background image; and
performing an image synthesizing process which synthesizes the color information of the foreground image having the reduced aliasing with the color information of the background image, using the alpha information of the foreground image having the reduced aliasing.

19. A control program stored on computer-readable recording medium which, when executed by a computer, results in performance of the image synthesis method according to claim 18.

* * * * *